UNITED STATES PATENT OFFICE.

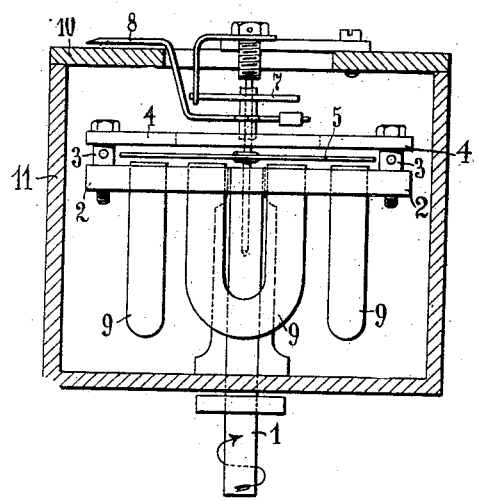
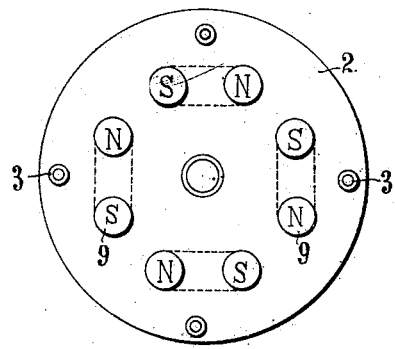

FRIEDRICH MEYER, OF SCHÖNEBERG, NEAR BERLIN, GERMANY, ASSIGNOR TO AKT. GES. MIX & GENEST TELEPHON & TELEGRAPHENWERKE, OF SCHÖNEBERG, BERLIN, GERMANY.

MAGNETIC TACHOMETER.

1,058,885.   Specification of Letters Patent.   Patented Apr. 15, 1913.

Application filed November 9, 1911. Serial No. 659,406.

*To all whom it may concern:*

Be it known that I, FRIEDRICH MEYER, a subject of the German Emperor, and residing at Schöneberg, near Berlin, Germany, have invented certain new and useful Improvements in Magnetic Tachometers, of which the following is a specification, reference being had to the drawing forming a part thereof.

My invention relates to that class of speed-measuring devices in which a system of permanent magnets is driven and, in consequence of eddy currents, exercises on an indicating disk a torque which opposes the action of a spring and is used for indicating the speed of the rotating system of magnets. In my magnetic tachometer I employ horseshoe magnets mounted axially in a plate rotated by the driving shaft. The north and south poles of these horseshoe magnets are arranged alternately and project a short distance beyond the face of the plate. I obtain the closed path for the lines of force requisite for a powerful field by means of a second plate which is mounted on the former one; this second or upper plate is adjustable relatively to the other in order that the field can be varied for the purpose of calibrating the tachometer.

The indicating disk is mounted between the upper and lower plates. By means of this arrangement I obtain the advantage that the entire system is very compact and, further, no disturbances are caused owing to the action of magnets of unequal strength.

One illustrative embodiment of my invention is represented by way of example in the accompanying drawing, wherein:—

Figure 1 is an elevation, the casing being shown in section. For the sake of clearness both the driving device, and its connection with the shaft whose speed is to be measured are not represented. Fig. 2 is a detail top plan view showing the horseshoe magnets in their supporting plate.

Referring to the drawing, the plate 2 composed of non-magnetizable material is fast on the shaft 1 driven by the device whose velocity is to be measured. This plate 2 carries the horseshoe magnets 9 assembled to form a rotating system of magnets, the poles of the individual magnets 9 being placed through holes in the plate 2 and secured in any suitable manner. The plate 2 also carries four distance studs or posts 3 for carrying the member 4 for closing the path of the lines of force. This member may be a plate or, preferably, a ring as the latter is lighter. It will of course be made of iron. The studs 3 are screw-threaded so that they can be screwed into and out of the plate 2. In this manner the distance between the poles of the magnets and the upper plate can be adjusted as desired.

The indicating disk 5 which acts as an induction disk is journaled between the magnet poles and the member 4 and is biased toward initial position by a spiral spring 7. When the disk 4 is rotated a pointer 8 is driven over a scale 10 provided on the casing 11.

The advantages of my magnetic tachometer are partly due to the form of the rotating system of magnets. The horseshoe magnets 9, of which any desired number are employed according to the torque required to be produced, are arranged in a circle with their poles in the same sense, as will be understood from Fig. 2, so that the adjacent poles of any two magnets are unlike. It is preferable so to arrange the individual magnets that all the poles are at equal distances one from another, because then the eddy currents induced in the disk 5 run in a very short path.

Another important feature of my magnetic tachometer is the member 4 which closes the path of the lines of force and participates in the rotation of the system. As movements between the iron or steel parts do not take place, neither hysteresis losses nor undesirable eddy currents in the iron can occur. In consequence of its being possible to vary the distance between the plate 4 and the magnets 9 the strength of field can be varied within wide limits. It is therefore possible to adjust the apparatus in an exceedingly simple manner to a predetermined torque and to equalize inequalities produced during its manufacture.

In the example according to Fig. 1 adjustable studs are employed for mounting and adjusting the plate 4. Any other means having the same effect may be employed for carrying this plate 4 without departing from the scope of my invention.

I claim:—

1. In a magnetic tachometer, the combination of a rotatable system of magnets comprising a driving shaft, a plate fast thereon and a plurality of horseshoe magnets mounted parallel with the axis of and arranged circumferentially about the plate, an upper plate attached to the system of magnets for closing the path of the lines of force of the same, an oscillating indicating disk between said upper plate and the system of magnets adapted to be rotated by eddy currents generated in the same by the system of magnets, and means for resisting the movement of said disk.

2. In a magnetic tachometer, the combination of a rotatable system of magnets, comprising a driving shaft, a plate fast thereon, and a plurality of horseshoe magnets mounted parallel with the axis of and arranged circumferentially about the plate, an upper plate adjustably attached to the system of magnets for closing the path of the lines of force of the same, an oscillating indicating disk between said upper plate and the system of magnets adapted to be rotated by eddy currents generated in the same by the system of magnets, and a biasing spring resisting the movement of said disk.

3. In a magnetic tachometer, the combination of a rotatable system of magnets comprising a driving shaft, a plate fast thereon, and a plurality of horseshoe magnets mounted parallel with the axis of and arranged circumferentially about the plate, the poles of said magnets projecting through the plate and being directed upward, an upper plate attached to the system of magnets for closing the path of the lines of force of the same, an oscillating indicating disk between said upper plate and the system of magnets adapted to be rotated by eddy currents generated in the same by the system of magnets, and a biasing spring resisting its movement.

4. In a magnetic tachometer, the combination of a rotatable system of magnets, comprising a driving shaft, a plate fast thereon, and a plurality of horseshoe magnets mounted parallel with the axis of and arranged circumferentially about the plate, the poles of said magnets projecting through the plate and being directed upward, an upper plate adjustably attached to the system of magnets for closing the path of the lines of force of the same, an oscillating indicating disk between said upper plate and the system of magnets adapted to be rotated by eddy currents generated in the same by the system of magnets, and a biasing spring for resisting its movement.

In testimony whereof I affix my signature in presence of two witnesses.

FRIEDRICH MEYER.

Witnesses:
HENRY HASPER,
WOLDEMAR HAUPT.